United States Patent [19]
Bouchaudon et al.

[11] 3,817,973
[45] June 18, 1974

[54] PROCESS FOR THE PREPARATION OF CYCLOPEPTIDES DERIVED FROM POLYMYXINS

[75] Inventors: Jean Bouchaudon, Morsang-Sur-orge; George Jolles, Sceaux, both of France

[73] Assignee: Rhone-Poulenc S. A., Paris, France

[22] Filed: Jan. 31, 1972

[21] Appl. No.: 222,296

[30] Foreign Application Priority Data
Feb. 2, 1971 France .............................. 71.03429

[52] U.S. Cl. ............................. 260/112.5, 424/177
[51] Int. Cl. ........................ C07c 103/52, C07g 7/00
[58] Field of Search ................................. 260/112.5

[56] References Cited
OTHER PUBLICATIONS
Suzuki et al., J. of Biochem., 56, 182, (1964).
Suzuki et al., J. of Biochem., 54, 555, (1963).
Studer et al., Helv. Chim. Acta, 48, 1371, (1965).

Primary Examiner—Lewis Gotts
Assistant Examiner—Reginald J. Suyat
Attorney, Agent, or Firm—Stevens, Davis, Miller & Mosher

[57] ABSTRACT

Polymyxins of the formula

A—X—Dab—Thr—Dab—Dab—Dab—Y—Z—Dab—Dab—Thr⎤
                                                                                    ⎦ wherein A is alkyl of three through 18 carbon atoms optionally substituted by hydroxy, amino or cyano; or alkyl of one through four carbon atoms substituted by a monocyclic or polycyclic alkyl radical or phenyl optionally substituted by halogen or alkoxy; or phenyl optionally substituted by halogen or alkoxy, X is —CO— or —SO$_2$—, and Y—Z is one of the chains D—Phe—Leu, D—Leu—Leu and D—Leu—Ileu, are prepared by introducing the grouping A—X—Dab—Thr—Dab— onto the appropriate cyclopeptide having its amino functions protected. New polymyxins of the said formula have antibiotic properties.

5 Claims, No Drawings

PROCESS FOR THE PREPARATION OF CYCLOPEPTIDES DERIVED FROM POLYMYXINS

This invention relates to the polymyxin derivatives of the general formula:

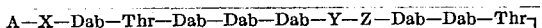

A—X—Dab—Thr—Dab—Dab—Dab—Dab—Y—Z—Dab—Dab—Thr (I)

wherein A represents a straight- or branched-chain alkyl radical containing three to 18 (preferably six to 16) carbon atoms which is optionally substituted, for example by a hydroxy, amino or cyano radical; a straight- or branched-chain alkyl radical containing one to four carbon atoms which is substituted by a monocyclic or polycyclic cycloalkyl radical (e.g. cyclohexyl or norbornyl) or by a phenyl radical which is optionally substituted by a halogen atom or an alkoxy radical containing one to four carbon atoms, or A represents a phenyl radical which is optionally substituted by a halogen atom or an alkoxy radical containing one to four carbon atoms, X represents the carbonyl (—CO—) or sulphonyl (—SO$_2$—) radical, and Y-Z represents one of the chains D—Phe—Leu, D—Leu—Leu and D—Leu—Ileu.

In this Specification the abbreviations used to denote the amino acids are those of the International Union of Pure and Applied Chemistry and the symbol Dab represents α,γ-diaminobutyric acid, it also being understood that, unless otherwise indicated, the amino acids have the L-configuration.

A certain number of polymyxins, hitherto isolated from mixtures obtained by fermentation, is already known. These polymyxins, which are of various types, are usually designated by the letters A, B, D, E and M or by the names circulins A and B. The polymyxins B and E and the circulins form a particular class of the products of general formula (I). More precisely, the polymyxins B and E and the circulins obtained by fermentation correspond to the general formula:

A$_1$—Dab—Thr—Dab—Dab—Dab—Dab—Y—Z—Dab—Dab—Thr (II)

wherein A$_1$ represents the n-octanoyl, L-6-methyloctanoyl or 6-methylheptanoyl radical and at the same time Y—Z represents D—Phe—Leu or D—Leu—Leu, or A$_1$ represents a L-6-methyloctanoyl or 6-methylheptanoyl radical and at the same time Y—Z represents D—Leu—Ileu.

The polymyxin derivatives of general formula (I), other than the polymyxins produced by fermentation of general formula (II), are new substances.

The present invention relates more particularly to these new polymyxin derivatives and salts thereof, their preparation and pharmaceutical compositions containing them in the form of a base and/or of a salt.

The process hereinafter described for the preparation of the said new polymyxin derivatives also makes possible the preparation of products of general formula (II) from appropriate starting materials. This process for the preparation of products of general formula (II), the products thus obtained, and the pharmaceutical compositions containing them in the form of a base and/or a salt form a further object of the invention.

According to the invention, the polymyxin derivatives of general formula (I) are prepared by reaction of a cyclopeptide of the general formula:

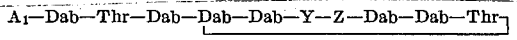

(α)H—Dab—Dab—Y—Z—Dab—Dab—Thr
     |          |     |
    G(γ)      G(γ) G(γ)

(III)

(wherein Y—Z is as hereinbefore defined, and G represents a radical which protects the γ-amino function of the α,γ-diaminobutyric acid of the general formula:

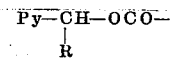

Py—CH—OCO—
     |
     R (IV)

in which Py represents a pyridyl or pyridyl-N-oxide radical unsubstituted or substituted by a methyl radical, and R represents a hydrogen atom, a straight- or branched-chain alkyl radical containing one to five carbon atoms, or a phenyl radical) with a compound of the general formula:

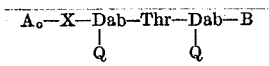

A$_o$—X—Dab—Thr—Dab—B
        |     |
        Q     Q (V)

(wherein X is as hereinbefore defined, Q represents a labile radical which protects the amine function, can preferably be removed by hydrogenolysis or acidolysis and is usually employed in peptide chemistry, such as the benzyloxycarbonyl or t-butoxycarbonyl group, or the radical G of general formula (IV) defined above, A$_o$ represents the group A as hereinbefore defined in all cases where that group does not carry an amino radical and represents QNH—A'— when the converse is the case, with A' then representing a straight- or branched-chain alkylene radical containing three to 18 carbon atoms, or A$_o$ represents a radical convertible into a group A under the conditions of removal of the protective radical Q, and B represents a hydroxy radical or a group which activates the carbonyl group and is usually employed in peptide chemistry, followed by removal of the protective groups of the amine functions and by optional conversion of the polymyxin base obtained into a salt.

The terminal group of the chain of the compounds of general formula (V) can be either the carboxy group or a derivative thereof such as the azide, the chloride, an activated ester such as the p-nitrophenol ester, the 2,4,5-trichlorophenol ester or the ester with N-hydroxysuccinimide, or a mixed anhydride of the general formula:

$$-CO-O-CO-R_1$$

(VI)

wherein R$_1$ represents an alkyl or alkoxy radical containing one to five carbon atoms. The azido group, which can be prepared by the reaction of an alkali metal nitrite on the corresponding hydrazide in an acid medium, is generally preferred.

The compounds of general formula (V) can be prepared by applying any customary method in peptide chemistry and, in particular, by the Merrifield method in the solid phase. It is also possible to employ other customary methods for lengthening peptide chains, such as the condensation of an acid, of which any amine functions are protected by a radical Q as defined above, with an ester of an amino acid in the presence of a carbodiimide such as dicyclohexylcarbodiimide, the azide method, the activated ester method or the mixed anhydride method.

The condensation of the terminal carboxylic acid (X = —CO—) can be achieved by reaction with a compound of the formula A$_o$COB, wherein A$_o$ and B are as hereinbefore defined, with the tripeptide chain.

The condensation of the terminal sulphonic acid (X = —SO$_2$—) can be achieved by any of the customary methods of preparation of sulphonamides from primary amines and, in particular, by reaction with a sulphonyl chloride of the formula $A_o$—$SO_2Cl$, wherein $A_o$ is as hereinbefore defined.

When the compounds of general formula (V) are prepared by the Merrifield method it can be advantageous to condense the terminal acid with the α-amino function of the L—α,γ—diaminobutyric acid, of which the γ-amino group has been protected by a radical Q as hereinbefore defined, and thereafter to carry out the condensation of the intermediate thus obtained with a compound of the general formula:

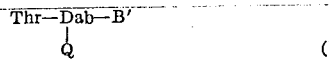

(VA)

wherein Q is as hereinbefore defined and B' represents the polymer employed. This prior condensation of the terminal acid is particularly advantageous when $A_oX'$— represents a sulphonic acid group, $A_o$ being as hereinbefore defined and X' representing the sulphonyl radical.

The reaction of the compounds of general formula (V) with the cyclopeptides of general formula (III) is carried out by application of methods which are customary in peptide chemistry, and in particular the azide method. In this case, the reaction is carried out in an organic solvent such as dimethylformamide, optionally in the presence of an organic base such as triethylamine, and at a temperature of between −15° and +25°C. However, it is also possible to condense an acid of general formula (V) with a cyclopeptide of general formula (III) in the presence of a carbodiimide such as dicyclohexylcarbodiimide, or to use the activated ester method or the mixed anhydride method.

The protective groups G of general formula (IV) can be removed from the product obtained by hydrogenolysis and, in particular, by the action of hydrogen in the presence of palladium or by the action of sodium in liquid ammonia. This hydrogenolysis also makes it possible to remove certain of the other protective groups Q and, in particular, the benzyloxycarbonyl group. However, depending on the nature of Q, it may be necessary to follow the hydrogenolysis by an acidolysis, in particular when Q is the t-butoxycarbonyl group which can be removed by the action of hydrogen chloride in methanol.

As examples of radicals $A_o$ convertible into groups A, there may be mentioned the radicals $A_o$ which contain multiple carbon-carbon bonds or carbonyl groups, which can be converted respectively into a single carbon-carbon bond and into a hydroxy group during removal of the protective groups Q by hydrogenolysis.

The cyclopeptides of general formula (III) can be obtained from the polymyxins of general formula (II) via products of the general formula:

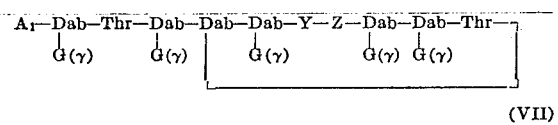

(VII)

wherein $A_1$ and Y-Z are as hereinbefore defined with respect to general formula (II). The method consists in carrying out a selective hydrolysis of the peptide bond which joins the sidechain to the peptide ring. This hydrolysis is carried out enzymatically under suitable conditions of temperature, pH and duration. Various proteolytic enzymes are capable of bringing about this selective hydrolysis, in particular the exocellular proteases elaborated by various strains of *Bacillus subtilis* such as subtilisin, nagarse, pronase, colistinase and alcalase, or the proteases elaborated by *Bacillus subtilis* GLAXO 417, *Bacillus subtilis* A.T.C.C. 9524 or *Bacillus subtilis* THE 4. Depending on the enzyme used, it is advantageous to carry out the operation at temperatures of between 20°and 70°C., in an aqueous medium buffered to a pH of between 5 and 9.

The products of general formula (VII) can be obtained from the polymyxins of general formula (II) by means of methods usually employed in peptide chemistry for blocking amine functions. It is particularly advantageous to react a mixed carbonate of the general formula:

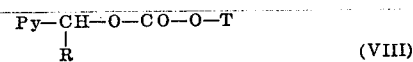

(VIII)

wherein the symbols Py and R are as hereinbefore defined and T represents a phenyl radical or a substituted phenyl radical, for example p-nitrophenyl or 2,4,5-trichlorophenyl, or a radical derived from a heterocyclic compound, for example the 8-quinolinyl or 2,5-dioxopyrrolidin-1-yl radical. The reaction is advantageously carried out in dimethylformamide and at about 20°C.

The mixed carbonates of general formula (VIII) can be prepared by reaction of a chloroformate of the general formula:

$$Cl—CO—O—T$$

(IX)

(wherein T is as hereinbefore defined) with an alcohol of the general formula:

(X)

wherein Py and R are as hereinbefore defined. This reaction is advantageously carried out in pyridine at 0°C.

The peptides of general formula (VII), the mixed carbonates of general formula (VIII) and the alcohols of general formula (X) in which the symbol Py represents a pyridyl-N-oxide radical can be obtained from the corresponding non-oxidised products by the action of an appropriate oxidising agent such as p-nitroperbenzoic acid. The N-oxide group can therefore be introduced at any desired stage of the preparation of the intermediate products of general formula (VII). The oxidation is generally carried out in an inert organic solvent such as an alcohol, e.g. methanol, a chlorinated hydrocarbon, e.g. chloroform, or an ester, e.g. ethyl acetate, at a temperature of between 0° and 25°C.

Hitherto, the polymyxins and circulins of general formula (II) have only been isolated in the pure state from complex mixtures obtained by fermentation. The separation of the consituents of such mixtures is particularly lengthy and requires delicate methods, especially when it is desired to obtain these constituents in a state of very high purity.

The process according to the present invention makes it possible, starting from a particular cyclopeptide of general formula (III), to prepare directly a polymyxin of general formula (II) which is free from products of similar structure, the pharmacological activity of which may be very different. Thus, starting from commercial colistin, which is known to be a mixture of colistins A, B and C all having in common the same basic cyclopeptide nucleus but possessing pharmacological activities of different intensities, the process according to the invention makes it possible to obtain only colistin A, which has the highest pharmacological activity. Equally, the process according to the invention makes it possible to utilise a colistin of low pharmacological activity and to convert it chemically into another pharmacologically more active colistin.

The polymyxin derivatives of general formula (I) may be converted by methods known per se into acid addition salts. The acid addition salts may be obtained by the action of acids on the polymyxin derivatives in appropriate solvents. As organic solvents there may be used alcohols, ethers, ketones or chlorinated hydrocarbons. The salt which is formed is precipitated, if necessary after concentration of the solution, and is isolated by filtration, decantation or lyophilisation.

The new polymyxin derivatives of the present invention and their acid addition salts possess valuable antibiotic properties. They have proved active against Gram-negative microorganisms in vitro and in vivo, and more particularly against *Escherichia coli* and *Pseudomonas aeruginosa*. Some of them have shown a not insignificant activity against *Staphylococcus aureus*.

In vitro, the bacteriostatic activity of the polymyxin derivatives of general formula (I) is 1 to 4 times greater than that of polymyxin $E_1$ or of colistin A [the compound of general formula (II) in which $A_1$ represents the L-6-methyl-octanoyl radical and Y—Z represents d—leu—leu].

Preferred polymyxin derivatives of the invention are those of general formula (I) wherein A represents a straight- or branched-chain alkyl radical containing three to 18 carbon atoms optionally substituted by a hydroxy or cyano radical, or a straight- or branched-chain alkyl radical containing one to four carbon atoms which is substituted by a monocyclic or polycyclic cycloalkyl radical or by a phenyl radical optionally substituted by an alkoxy radical containing one to four carbon atoms, and more especially those such compounds wherein A represents an alkyl radical containing six to 16 carbon atoms optionally substituted by a hydroxy radical, or A represents an alkyl radical containing one to four carbon atoms substituted by a cyclohexyl radical or a phenyl radical optionally carrying a methoxy substituent. Of outstanding importance are N-α-(N-α3-phenylpropionyl-L-α,γ-diaminobutyryl-L-threonyl-N-α-L-α,γ-diaminobutyryl)-colistamine [the chemical structure of "colistamine" is hereinafter identified], N-α-(N-α-heptanoyl-L-α,γ-diaminobutyryl-L-threonyl-N-α-L-α,γ-di-aminobutyryl)-colistamine, N-α-(N-α-3-cyclohexylpropionyl-L-α,γ-diaminobutyryl-L-threonyl-N-α-L-α,γ-diaminobutyryl)-colistamine and N-α-(N-α-4-phenylbutyryl-L-α,γ-diaminobutyryl-L-threonyl-N-α,γ-diaminobutyryl)-colistamine, and salts thereof.

For therapeutic purposes, the polymyxin derivatives of general formula (I) may be employed as such or in the form of pharmaceutically-acceptable salts, i.e., salts which are non-toxic to the animal organism in therapeutic doses of the salts. Examples of pharmaceutically-acceptable salts of the polymyxin derivatives are acid addition salts (such as hydrochlorides, sulphates, nitrates, acetates, propionates, succinates, benzoates, fumarates, maleates, tartrates, phosphates theophyllinacetates, salicylates, phenolphthalinates and methylene-bis-β-hydroxy-naphthoates) or, when one of the acids of the side-chain is a diacid, metal salts (such as the sodium salts) or salts with nitrogen-containing bases.

The cylcopeptide of general formula (III) wherein Y represents D-leucine and Z represents L-leucine and wherein the amino radicals of the α,γ-diaminobutyric acids are not protected by radicals G, that is to say the cyclopeptide of the formula:

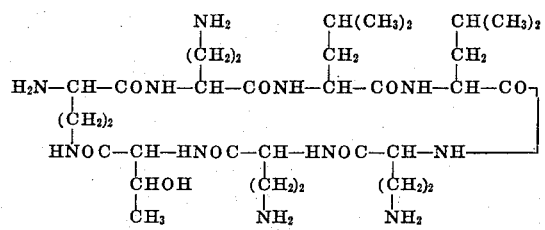

is hereinbefore in relation to preferred compounds of the invention and hereinafter, for simplicity in writing, referred to as "colistamine."

The following Examples illustrate the invention.

EXAMPLE 1

Triethylamine (15.9 cc.) was added to a solution of N-α-t-butoxycarbonyl-N-γ-benzyloxycarbonyl-L-α,γ-diaminobutyric acid (40 g.) in ethanol (350 cc.). The mixture was stirred for 3 minutes at 20°C. and then concentrated to dryness under reduced pressure (20 mm.Hg) at 50°C. The resulting oil was dissolved in ethanol (1 litre). A previously chloromethylated styrene-divinylbenzene resin (180 g.) (which will be referred to as chloromethylated "polymer,") containing 0.70 milli-equivalent of chlorine per gram, was added to the solution obtained. The reaction mixture was stirred for 48 hours at 78°C. The polymer was filtered off, washed successively with ethanol (4 × 300 cc.), distilled water (4 × 300 cc.) and methanol (4 × 300 cc.) and then dried under reduced pressure (0.3 mm.Hg) at 20°C. to give N-α-t-butoxycarbonyl-N-γ-benzyloxycarbonyl-L-α,γ-diaminobutyryl-"polymer"(196 g.)

(L-α,γ-Diaminobutyric acid : 0.19 mmol. per gram of polymer).

EXAMPLE 2

The second amino acid forming the side-chain, namely threonine, was linked to the first intermediate "blocked L-α,γ-diaminobutyric acid-polymer" by carrying out the following series of operations:

1. The "blocked L-α,γ-diaminobutyric acid polymer" intermediate was washed three times in succession with glacial acetic acid (110 cc. each time). Each addition of acid was followed by stirring for 3 minutes and then filtering.

2. The protective group of the α-amino radical of the amino acid was thereafter removed by adding an N solution of hydrochloric acid in acetic acid (110 cc.), stirring for 30 minutes and then filtering.

3. The resulting product was then successively washed with
   a. acetic acid (3 × 110 cc.),
   b. ethanol (3 × 110 cc.) and
   c. chloroform (3 × 110 cc.), stirring for 3 minutes after each addition of washing agent and filtering each time.

4. The product obtained was then neutralised by adding a chloroform-triethylamine mixture (9:1 by volume; 110 cc.), stirring for 20 minutes and then filtering.

5. The resulting product was successively washed with
   a. chloroform (3 × 110 cc.),
   b. ethanol (3 × 110 cc.) and
   c. methylene chloride (3 × 110 cc.),
   stirring for 3 minutes after each addition of washing agent and filtering each time.

6. The following were then added successively:
   a. threonine, the amino radical of which was protected, dissolved in methylene chloride (110 cc.) and, after stirring for 10 minutes.
   b. dicyclohexylcarbodiimide in methylene chloride (20 cc.); the mixture was stirred for 15 hours and the product filtered off.

7. The product obtained was then washed successively with
   a. methylene chloride (3 × 110 cc.) and
   b. ethanol (3 × 110 cc.)
   with 3 minutes stirring after each addition of washing agent and filtering each time.

This sequence of operations was repeated a first time for the condensation of the third amino acid, namely L-α,γ-diaminobutyric acid, the amino radicals of which were protected, and then a second time for the condensation of the terminal acid.

When the terminal acid carries an amino radical, this radical must be protected.

After the condensation of the terminal acid operation ), operations a) and 7(b) were carried out.

It may be preferable at times to repeat the sequence of operations described above only once. The last reagent is in that case L-α,γ-diaminobutyric acid, the α-amino group of which already carries the terminal acid. After this last condensation, operations 7(a) and 7(b) were carried out.

Summarising, all the stages shown in the Table below were carried out for the condensation of each amino acid and for the condensation of the terminal acid:

benzyloxy-carbonyl-L-α,γ-diaminobutyryl-L-threonyl-N-α-benzyloxy-carbonyl-L-α,γ-diaminobutyrylhydrazide.

N-α-t-butoxycarbonyl-N-γ-benzyloxycarbonyl-L-α,γ-diaminobutyryl-"polymer"(19.4 g.), prepared as described in Example 1 and containing 3.6 mmols. of blocked L-α,γ-diamino-butyric acid, was introduced into a reactor equipped with a stirrer and, at its bottom, with a sintered glass filter. After carrying out operations 1 to 5, N-t-butoxycarbonyl-L-threonine (2.95 g.) in methylene chloride (110 cc.) was added. After 10 minutes' stirring, N,N'-dicyclohexyl-carbodiimide (2.85 g.) in methylene chloride (20 cc.) was added. Operation 6(b) was performed as previously mentioned and operations 7 and 1 to 5 were then successively carried out.

N-α-t-Butoxycarbonyl-N-γ-benzyloxycarbonyl-L-α,γ-diaminobutyric acid (4.75 g.) in methylene chloride (110 cc.) was then added. After stirring of the mixture for 10 minutes, N,N'-dicyclohexylcarbodiimide (2.85 g.) dissolved in methylene chloride (20 cc.) was added. Operation 6(b) was then performed as previously mentioned and operations 7 and 1 to 5 were then successively carried out.

3,5,5-Trimethylhexanoic acid (2.18 g.) dissolved in methylene chloride (110 cc.) was added, the mixture stirred for 10 minutes and N,N'-dicyclohexylcarbodiimide (2.85 g.) dissolved in methylene chloride (20 cc.) was then added. The mixture was stirred for 15 hours and, after filtering, the product obtained was successively washed with methylene chloride (3 × 110 cc.) and ethanol (3 × 110 cc.) with stirring for 3 minutes after each addition of wash solvent and filtering before each fresh addition of solvent.

N-α-3,5,5-Trimethylhexanoyl-N-γ-benzyloxycarbonyl-L-α,γ-diaminobutyryl-L-threonyl-N-γ-benzyloxycarbonyl-L-α,γ-diaminobutyryl-"polymer" was thus obtained.

This product was washed with dimethylformamide (3 × 110 cc.) and then suspended in a 22 percent (v/v) solution of hydrazine hydrate in dimethylformamide (150 cc.). The reaction mixture was stirred for 16 hours at 20°C. The product was filtered off and washed with di-

| Operation | Reagent | Number of operations | Volume of reagent in cc. | Period of stirring for each operation | Objective |
| --- | --- | --- | --- | --- | --- |
| 1 | Acetic acid | 3 | 110 | 3 mins. | Washing |
| 2 | N solution of hydrochloric acid in acetic acid | 1 | 110 | 30 mins. | Removal of protective groups |
| 3(a) | Acetic acid | 3 | 110 | 3 mins. | Washing |
| 3(b) | Ethanol | 3 | 110 | 3 mins. | Washing |
| 3(c) | Chloroform | 3 | 110 | 3 mins. | Washing |
| 4 | CHCl$_3$ + (C$_2$H$_5$)$_3$N, 9:1 (by volume) | 1 | 110 | 20 mins. | Neutralisation |
| 5(a) | Chloroform | 3 | 110 | 3 mins. | Washing |
| 5(b) | Ethanol | 3 | 110 | 3 mins. | Washing |
| 5(c) | Methylene chloride | 3 | 110 | 3 mins. | Washing |
| 6(a) | Blocked amino acid or terminal acid in methylene chloride | 1 | 110 | 10 mins. | Mixing |
| 6(b) | Dicyclohexylcarbodiimide in methylene chloride | 1 | 20 | 15 hours | Condensation |
| 7(a) | Methylene chloride | 3 | 110 | 3 mins. | Washing |
| 7(b) | Ethanol | 3 | 110 | 3 mins. | Washing |

Filtration was carried out between each operation, except between operations 6(a) and 6(b). All the operations were carried out at a temperature of about 20°C.

Preparation of N-α-3,5,5-trimethyl-hexanoyl-N-γ- methylformamide (100 cc.). The insoluble matter was treated a second time as described above. The filtrates were combined and concentrated to dryness under reduced pressure (0.3 mm.Hg ) at 55°C. The resulting oil was taken up in distilled water (200 cc.); the insoluble matter was filtered off and washed with methanol (2 × 30 cc.) and diethyl ether (2 × 30 cc.). After drying under reduced pressure (0.3 mm.Hg.) at 20°C., N-α-3,5,5-trimethylhexanoyl-N-γ-benzyloxycarbonyl-L-α,γ-diaminobutyryl-L-threonyl-N-γ-benzyloxycarbonyl-L-α,γ-diaminobutyrylhydrazide (1.76 g.) was obtained.

| Analysis | Calculated % | C 59.90 | H 7.47 | N 13.21 |
|---|---|---|---|---|
| | Found | 59.64 | 7.5 | 13.45 |

After complete hydrolysis, analysis on a Technicon auto-analyser showed the presence of the following amino acids:

Dab = 2.0 (theory = 2)
Thr = 1.0 (theory = 1)

EXAMPLES 3 to 14

By operating as described in Example 2 but replacing the 3,5,5-trimethylhexanoic acid by the appropriate acid, the following products, which correspond to general formula V in which Q represents the benzyloxycarbonyl radical, X the —CO— radical and B the —NH—NH₂ radical, were prepared:

EXAMPLE 15

By operating as described in Example 2 but successively using N-α-t-butoxycarbonyl-N-γ-benzyloxycarbonyl-L-α,γ-diaminobutyryl-"polymer" (10 g.) (prepared as described in Example 1 and containing 3.4 mmols. of blocked L-α,γ-diaminobutyric acid), N-t-butoxycarbonyl-L-threonine (3 g.) followed by N,N'-dicyclohexylcarbodiimide (2.8 g.), and N-α-octylsulphonyl-N-γ-benzyloxycarbonyl-L-α,γ-diaminobutyric acid (6.9 g.) followed by N,N'-dicyclohexylcarbodiimide (3.3 g.), N-α-octylsulphonyl-N-γ-benzyloxycarbonyl-L-α,γ-diaminobutyryl-L-threonyl-N-γ-benzyloxycarbonyl-L-α,γ-diaminobutyryl-"polymer" (about 12 g.) was obtained.

After treatment with hydrazine, N-α-octylsulphonyl-N-γ-benzyloxycarbonyl-L-α,γ-diaminobutyryl-L-threonyl-N-γ-benzyloxycarbonyl-L-α,γ-diaminobutyrylhydrazide (1.54 g.) was obtained.

| Analysis: | | | | | |
|---|---|---|---|---|---|
| Calculated % | | C 55.58 | H 7.12 | N 12.60 | S 4.12 |
| Found | | 55.43 | 7.05 | 12.76 | 4.52 |

N-α-Octylsulphonyl-N-γ-benzyloxycarbonyl-L-α,γ-diaminobutyric acid used as an intermediate can be prepared in the following manner:

A solution of octylsulphonyl chloride (8.10 g.) [prepared according to C. Ziegler et al, J. Org. Chem., 16, 621 (1951)] in methylene chloride (100 cc.) was added over the course of 30 minutes to a solution, cooled to 0°C., of methyl N-γ-benzyloxycarbonyl-L-α,γ-diaminobutyrate in methylene chloride (200 cc.) and anhydrous pyridine (3.06 cc.). After the end of the addition, the reaction mixture was stirred for 2 hours at

| Example | A₀ | Calculated | | | Found | | |
|---|---|---|---|---|---|---|---|
| | | C | H | N | C | H | N |
| 3 | 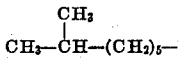 CH₃—CH—(CH₂)₅— with CH₃ branch | 59.9 | 7.47 | 13.22 | 59.68 | 7.11 | 12.9 |
| 4 | CH₃(CH₂)₅— | 59.41 | 7.34 | 13.47 | 59.23 | 7.13 | 13.45 |
| 5 | CH₃(CH₂)₆— | 58.89 | 7.2 | 13.73 | 57.7 | 6.66 | 14.14 |
| 6 | 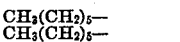 | 60.23 | 6.97 | 13.29 | 59.45 | 6.8 | 13.2 |
| 7 |  | 60.07 | 7.22 | 13.25 | 59.68 | 7.1 | 13.24 |
| 8 | 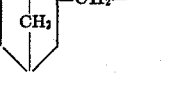 CH₃(CH₂)₅—CH(OH)— | 58.13 | 7.18 | 13.18 | 58.39 | 7.4 | 13.67 |
| 9 | 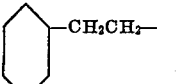 CH₃(CH₂)₆C(O)— | 58.79 | 7.07 | 12.97 | 58.1 | 7.25 | 13.8 |
| 10 | CN(CH₂)₁₀— | 60.44 | 7.35 | 14.09 | 60.3 | 7.55 | 14.0 |
| 11 | 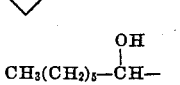 CH₃(CH₂)₅CH(OH)—CH₂— | 58.63 | 7.31 | 12.93 | 59.48 | 6.66 | 13.54 |
| 12 | 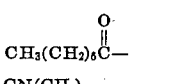 CH₃O—⟨⟩—CH=CH— | 59.91 | 6.22 | 12.87 | 59.1 | 6.1 | 13.1 |
| 13 | 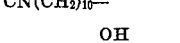 ⟨⟩—CH=CH— | 60.72 | 6.20 | 13.4 | 60.24 | 6.6 | 14.28 |
| 14 | 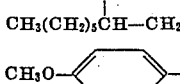 ⟨⟩—CH₂—CH₂CH₂— | 61.03 | 6.6 | 13.11 | 61.67 | 6.04 | 13.45 |

0°C., 20 hours at 20°C. and 20 hours at the boiling point. The reaction mixture was washed with N hydrochloric acid (2 × 200 cc.) and a saturated sodium bicarbonate solution (2 × 200 cc.) and then dried over anhydrous sodium sulphate. After concentration to dryness under reduced pressure (20 mm.Hg ) at 50°C., methyl N-α-octylsulphonyl-N-γ-benzyloxycarbonyl-L-α,γ-diaminobutyrate (8.8 g.) was obtained, and this was dissolved in methanol (100 cc.) and N sodium hydroxide solution (40 cc.) This solution was stirred for 16 hours at 20°C. The reaction mixture was concentrated to about 30 cc. under reduced pressure (20 mm.Hg ) at 50°C., then diluted to 100 cc. by adding distilled water, extracted with ethyl acetate (2 × 50 cc.) and then brought to pH 2 by addition of N hydrochloric acid (about 50cc.). The aqueous phase was extracted three times with ethyl acetate ( total 200 cc.). The organic phase was dried over anhydrous sodium sulphate and, after concentration in vacuo (20 mm.Hg) at 50°C., N-α-octylsulphonyl-N-γ-benzyloxycarbonyl-L-α,γ-diaminobutyric acid (7.7 g.) was obtained.

EXAMPLE 16

N,N'-Carbonyldiimidazole (80.65 percent titer; 35 g.) was added to a solution of nonanoic acid (22.3 g.) in anhydrous dimethylformamide(67 cc.) and anhydrous dioxan (267 cc.) cooled to 0°C. The reaction mixture was stirred for 2 hours at 0°C. On the other hand, methyl N-γ-benzyloxycarbonyl-L-α,γ-diaminobutyryl-L-threoninate hydrochloride (57 g.) [prepared according to the method of K. Vogler et al, Helv. Chim. Acta, 48, 1161 (1965)] was dissolved in lukewarm anhydrous dimethylformamide (200 cc.). Anhydrous dioxan (808 cc.) and triethylamine (14.2 g.) were added, the mixture cooled to 0°C. and stirred for 10 minutes. The triethylamine hydrochloride formed was filtered off. The filtrate obtained was added to the activated nonanoic acid solution. The reaction mixture was stirred for 2 hours at 0°C., and then the temperature was allowed to rise to 20°C. and stirring was continued for 16 hours at this temperature. The mixture was concentrated to dryness under reduced pressure (20 mm., and then 0.3 mm.Hg.) at 50°C. The residue was taken up in ethyl acetate (750 cc.). Some insoluble matter was filtered off and the filtrate washed with N hydrochloric acid (2 × 250 cc.), a 5 percent (w/v) solution of sodium bicarbonate (2 × 250 cc.) and a saturated sodium chloride solution (2 × 200 cc.) and was concentrated to dryness under reduced pressure (20 mm.Hg) at 50°C. The residue was taken up in diethyl ether (100 cc.) and filtered off and washed with petroleum ether (50 cc.). After drying under reduced pressure (0.3 mm.Hg.), methyl N-α-nonanoyl-N-γ-benzyloxycarbonyl-L-α,γ-diaminobutyryl-L-threoninate (35 g.) was obtained.

$[\alpha]_D^{19.5°} = -9.2$ (c = 0.5; methanol).

Hydrazine hydrate (19.7 cc.) was added to the solution of this methyl N-α-nonanoyl-N-γ-benzyloxycarbonyl-L-α,γ-diaminobutyryl-L-threoninate (35 g.) in methanol (250 cc.). The reaction mixture was stirred for 16 hours at 20°C. The precipitate formed was filtered off and washed with water (3 × 150 cc.), acetone (3 × 150 cc.) and diethyl ether (2 × 150 cc.). After drying under reduced pressure (0.3 mm. Hg), N-α-nonanoyl-N-γ-benzyloxycarbonyl-L-α,γ-diaminobutyryl-L-threonylhydrazide (33 g.) was obtained.

This product was dissolved in a mixture of acetic acid (440 cc.), N hydrochloric acid (132 cc.), distilled water (148 cc.) and ethyl acetate (1,100 cc.) cooled to -2°C.; sodium nitrite (4.9 g.) dissolved in distilled water (27 cc.) was added. After stirring for 20 minutes at -2°C., ice-water (550 cc.) was added. The aqueous phase was decanted and then washed with ethyl acetate (275 cc.) at 0°C. The combined organic phases were washed with an ice-cold 10 percent (w/v) solution of sodium carbonate (3 × 550 cc.) an ice-cold 5 percent (w/v) solution of sodium bicarbonate (5 × 275 cc.) and then an ice-cold saturated solution of sodium chloride (275 cc.). The organic phase (containing the azide) was dried over sodium sulphate for 15 minutes at 0°C. During this time, methyl N-γ-benzyloxycarbonyl-L-α,γ-diaminobutyrate hydrochloride (21.4 g.) was dissolved in dimethylformamide (110 cc.). The solution was cooled to 0°C. and triethylamine (10 cc.) added. The mixture was stirred for 10 minutes at 0°C. and the triethylamine hydrochloride formed filtered off. The filtrate obtained was added to the solution of azide in ethyl acetate which had been freed of sodium sulphate by filtration. The reaction mixture was stirred for 16 hours at 0°C. and then for 24 hours at 20°C. Some insoluble matter was filtered off and the filtrate washed with a 5 percent (w/v) solution of sodium bicarbonate (2 × 350 cc.), N hydrochloric acid (2 × 350 cc.) and water (2 × 200 cc.) and concentrated to dryness under reduced pressure (20 mm.Hg) at 50°C. The residue was taken up in distilled water (200 cc.) and a solid obtained filtered off. After drying under reduced pressure (0.3 mm.Hg) at 20°C., methyl N-α-nonanoyl-N-γ-benzyloxycarbonyl-L-α,γ-diaminobutyryl-L-threonyl-N-γ-benzyloxycarbonyl-L-α,γ-diaminobutyrate (28 g.) was obtained.

$[\alpha]_D^{20°} = -21$ (c = 0.5; dimethylformamide).

Hydrazine hydrate (40 cc.) was added to a solution of methyl N-α-nonanoyl-N-γ-benzyloxycarbonyl-L-α,γ-diamino-butyryl-L-threonyl-N-γ-benzyloxycarbonyl-L-α,γ-diamino-butyrate (30 g.) (prepared as described above) in dimethylformamide (500 cc.). The reaction mixture was stirred for 16 hours at 20°C. The precipitate formed was filtered off and washed with water (3 × 150 cc.) and then with diethyl ether (3 × 100 cc.). After drying under reduced pressure (0.3 mm.Hg) at 20°C., N-α-nonanoyl-N-γ-benzyloxycarbonyl-L-α,γ-diaminobutyryl-L-threonyl-N-γ-benzyloxycarbonyl-L-α,γ-diaminobutyrylhydrazide (24.3 g.) was obtained.

$[\alpha]_D^{20°} = -28$ [c = 0.48; $CH_3COOH$ — N HCl 5:1 (by volume)]

| Analysis: | Calculated % | C 59.90 | H 7.47 | N 13.22 |
|---|---|---|---|---|
| | Found | 59.74 | 8.10 | 13.25 |

EXAMPLE 17

Alkaline protease elaborated by *Bacillus subtilis* (containing 9.5 U/mg.) (1.02 g.) was added to a solution of penta-N-(3-pyridyl-N-oxide-methoxycarbonyl)-polymyxin B (3.17 g.) in a solution (634 cc.) buffered to pH 6, and the reaction mixture was stirred for 3 hours at 22°C. Immediately afterwards, the reaction mixture was brought to pH 3 by addition of N hydrochloric acid. The insoluble matter was filtered off and the filtrate concentrated to dryness under reduced pressure (20 mm.Hg) at 50°C. A cream powder was obtained, which was dissolved in distilled water (60 cc.); Amberlite IRA 400 (OH form) (60 cc.) was added to the solution. The mixture was stirred for 1 hour and filtered, the resulting resin washed with distilled water (200 cc.) and the aqueous phase lyophilised. The solid obtained was taken up in methanol (50 cc.) and the mixture stirred for one-half hour. The insoluble matter was filtered off and washed with methanol (3 × 15 cc.). The filtrate was concentrated to dryness under reduced pressure (20 mm.Hg) at 50°C. The solid residue obtained was dissolved in a methanol-dioxan solution (95:5 by volume; 5 cc.) and the solution chromatographed on a silica column (height: 70 cm.; diameter: 1.8 cm). Elution was carried out with a methanol-dioxan mixture (95:5 by volume) collecting fractions of 25 cc. Fractions 30 to 40 were combined and concentrated to dryness under reduced pressure (20 mm.Hg) at 50°C. Cyclo-[N-γ-L-α, γ-diaminobutyryl-N-γ-(3-pyridyl-N-oxide-methoxycarbonyl)-L-α,γ-diaminobutyryl-D-phenylalanyl-L-leucyl-N-γ-(3-pyridyl-N-oxide-methoxycarbonyl)-L-α,γ-diaminobutyryl-N-γ-(3-pyridyl-N-oxide-methoxycarbonyl)-L-α,γ-diaminobutyryl-L-threonyl] was thus obtained.

Rf = 0.27 [silica gel; n-butanol:pyridine:acetic acid:water (50:20:6:24 by volume)].

The solution buffered to pH 6 used to dissolve the penta-N-(3-pyridyl-N-oxide-methoxycarbonyl)-polymyxin B was obtained by adjusting a solution of monopotassium phosphate (454 mg.) in distilled water (1 litre) to pH 6 (determined by means of a pH meter) by addition of a solution of disodium phosphate dodecahydrate (1.2 g.) in distilled water (1 litre).

The enzyme unit is the quantity of enzyme which at pH 9.5 and 50°C. liberates from casein, in 1 minute, sufficient peptide soluble in trichloroacetic acid to show an increase in optical density of 1.00 at 280 nm. The enzyme strength (U/mg.) is therefore the number of units per mg. of substance. This method of determination of the enzymatic activity is similar to that described by M. Kunitz, J. Gen. Physiol., 30, 291 (1947).

Penta-N-(3-pyridyl-N-oxide-methoxycarbonyl)-polymyxin B was obtained as follows:

p-Nitroperbenzoic acid (21.96 g.) was added to a solution of 3-hydroxymethyl-pyridine (10.9 g.) in ethyl acetate (200 cc.) cooled to 0°C. After 15 minutes' stirring at 0°C. followed by gradual return of the reaction mixture to about 20°C., the precipitate obtained was filtered off, washed with ethyl acetate (100 cc.) and dried under reduced pressure (0.3 mm.Hg) at about 20°C. The product obtained was then suspended in distilled water (200 cc.); Amberlite IRA 402 resin (90 cc.) in the carbonate form was added to this suspension and the mixture stirred for 25 minutes at about 20°C. The resulting resin was filtered off and washed with distilled water (2 × 100 cc.). The filtrate and the wash liquors were combined and concentrated to dryness under reduced pressure (20 mm.Hg) at 55°C. The oil obtained was dissolved in boiling ethyl acetate (80 cc.). After gradual return to 20°C. and maintenance of this temperature for 15 minutes, the precipitate which formed was filtered off and washed with ethyl acetate (50 cc.).

After drying under reduced pressure (0.3 mm.Hg) at 20°C., 3-hydroxymethyl-pyridine-N-oxide (11.6 g.), melting at 90°C. (instantaneous Kofler melting point), was obtained.

| Analysis: | Calculated % | N → 0 23.98 |
|---|---|---|
| | Found | 23.70 | p-Nitrophenyl chloroformate (1.61 g.) was added in small portions, over the course of 30 minutes, to a solution of 3-hydroxymethyl-pyridine-N-oxide (1 g.) in pyridine (14 cc.) cooled to 0°C. Stirring of the reaction mixture was continued for 17 hours at about 20°C. The precipitate which formed was filtered off, washed with pyridine (2 × 4 cc.) and dried under reduced pressure (0.3 mm.Hg) at 20°C. to give the mixed (3-pyridyl-N-oxide)-methyl p-nitrophenyl carbonate (1.2 g.), melting at 160°C. (Kofler instantaneous melting point).

The mixed (3-pyridyl-N-oxide)-methyl p-nitrophenyl carbonate (3.18 g.) was added to a suspension of polymyxin B (2.17 g.) in dimethylformamide (145 cc.). After 24 hours' stirring at 60°C. and 65 hours' stirring at 20°C., the insoluble matter was filtered off. The filtrate was concentrated to dryness under reduced pressure (0.3 mm.Hg) at 60°C. The residue was dissolved in methanol (7 cc.) and the solution chromatographed on a column of Sephadex LH 20 (diameter of the column:38 mm.; height 1.80 m.). The column was eluted with methanol, collecting fractions of 7 cc. Fractions 130 to 170 were combined and concentrated to dryness under reduced pressure (20 mm.Hg) at 50°C. to give penta-N-(3-pyridyl-N-oxide-methoxycarbonyl)-polymyxin B (3.2 g.).

Rf = 0.30 [silica gel; n-butanol:pyridine:acetic acid:water (50:20:6:24 by volume)].

EXAMPLE 18

The protease (18 g.) elaborated by *Bacillus subtilis* THE 4 was added to a solution of penta-N-(3-pyridyl-N-oxide-methoxycarbonyl)-colistin (60 g.) in a solution (12 litres) buffered to pH 6 (prepared as in Example 17), and the reaction mixture was stirred at 20°C. for 3 hours. Immediately afterwards, the reaction was stopped by adjusting the solution to pH 3 by addition of N hydrochloric acid. The reaction mixture was cooled to −70°C. and lyophilised. The resulting solid residue was stirred in anhydrous ethanol (1.92 litres) for 40 hours at 20°C. The insoluble matter was filtered off and the filtrate concentrated to dryness under reduced pressure (20 mm.Hg) at 50°C. The solid residue obtained was dissolved in a methanol-dioxan mixture (95:5 by volume; 70 cc.) and the solution chromatographed on a column containing silica gel (700 g.) in its lower part and alumina (500 g.) in its upper part (column diameter 5.7 cm.; height 77 cm.). The column was eluted with a methanol-dioxan mixture (95:5 by volume), collecting 1 litre fractions; fractions 3 to 7 were combined and then concentrated to dryness under reduced pressure (15 mm.Hg) at 50°C. Tri-N-γ-(3-pyridyl-N-oxide-methoxycarbonyl)-colistamine (15.55 g.) was thus obtained.

Rf = 0.22 [silica gel; n-butanol:pyridine:acetic acid:water (50:20:6:24 by volume)].

Penta-N-(3-pyridyl-N-oxide-methoxycarbonyl)-colistin was obtained as follows:

p-Nitrophenol chloroformate (201.54 g.) was added in small portions, over the course of about 1¼ hours, to a solution of 3-hydroxymethyl-pyridine (109.1 g.) in pyridine (500 cc.) cooled to 0°C. Stirring of the reaction mixture was continued for 1 hour at 0°C.; afterwards the temperature of the mixture was allowed to rise again to 20°C., and the stirring continued for 16 hours at this temperature. Methylene chloride (1.6 litres) was added, and the solution washed with distilled water (3 × 500 cc.) and then with a saturated sodium chloride solution (500 cc.). The organic solution was dried over sodium sulphate and then concentrated to dryness under reduced pressure (20 mm.Hg) at 50°C. The oil obtained was dissolved in ethanol (1.6 litres) and the solution left to stand for 16 hours at 0°C. The resulting precipitate was filtered off, washed with ethanol (100 cc.) and dried under reduced pressure (0.3 mm.Hg ) to give the mixed 3-pyridylmethyl p-nitrophenyl carbonate (128 g.) melting at 93°C. (Kofler instantaneous melting point).

Rf = 0.73 [silica gel; methanol:1,2-dichloroethane (2:8 by volume)].

| Analysis: | Calculated % | C 56.94 | H 3.67 | N 10.21 |
|---|---|---|---|---|
| | Found | 57.58 | 3.86 | 9.89 | p-Nitroperbenzoic acid (12.1 g.) was added to a solution of the mixed 3-pyridylmethyl p-nitrophenyl carbonate (15.1 g.) in chloroform (400 cc.). After stirring for 16 hours at 20°C., the precipitate which formed was filtered off and washed with chloroform (2 × 100 cc.). The filtrate and the wash liquors were combined and concentrated to dryness under reduced pressure (17 mm.Hg.) at 30°C.

The solid residue was suspended in diethyl ether (600 cc.) and the suspension vigorously stirred for 10 minutes. The insoluble matter was filtered off and again suspended in diethyl ether (600 cc.). After 10 minutes' stirring, the insoluble matter was filtered off, washed with diethyl ether (100 cc.) and dried under reduced pressure (0.3 mm.Hg) at 20°C. to give the mixed (3-pyridyl-N-oxide)-methyl p-nitrophenyl carbonate (14.9 g.).

Rf = 0.4 [silica gel; methanol:1,2-dichloroethane (2:8 by volume)].

The mixed (3-pyridyl-N-oxide)-methyl p-nitrophenyl carbonate (30 g.) was added to a suspension of colistin (12 g.) in dimethylformamide (900 cc.). After stirring for 64 hours at 20°C., the insoluble matter was filtered off. The filtrate was concentrated to 2/3rds. of its volume under reduced pressure (0.3 mm.Hg.) at 50°C. On addition of diethyl ether (500 cc.) to the concentrate, an oil separated out; it was separated and dissolved in methanol (500 cc.). Diethyl ether (500 cc.) was added to the solution obtained. An oil separated out and then crystallised. After 15 hours' standing at 20°C., the crystals were filtered off, washed with diethyl ether (100 cc.) and dried under reduced pressure (0.3 mm.Hg.) at 20°C. Penta-N-(3-pyridyl-N-oxide-methoxy-carbonyl)-colistin (16.8 g.) was thus obtained.

Rf = 0.32 [silica gel; n-butanol:pyridine:acetic acid:water (50:20:6:24 by volume)].

| Analysis: | Calculated % | N→O 7.79 |
|---|---|---|
| | Found | 7.60 |

EXAMPLE 19

Sodium nitrite (62 mg.) dissolved in distilled water (1 cc.) was added to a solution of N-α-7-methyloctanoyl-N-γ-benzyloxycarbonyl-L-α,γ-diaminobutyryl-L-threonyl-N-γ-benzyloxycarbonyl-L-α,γ-diaminobutyrylhydrazide (631 mg.) (prepared as in Example 3) in a mixture of acetic acid (16 cc.) and N hydrochloric acid (1.8 cc.), cooled to 2°C. After 20 minutes' stirring at 2°C., the reaction mixture was poured into an ice-cold 5 percent (w/v) solution of sodium bicarbonate (400 cc.). The white precipitate which formed was filtered off at 0°C. and washed with ice-cold distilled water (200 cc.). This precipitate was added to an ice-cold solution of tri-N-γ-(3-pyridyl-N-oxide-methoxycarbonyl)-colistamine (1 g.) (prepared as described in Example 18) in dimethylformamide (120 cc.). The reaction mixture was stirred for 2 hours at 0°C. and then for 48 hours at 20°C. and subsequently poured into distilled water (450 cc.), and the whole was left to stand for 1 hour at 20°C. The precipitate which formed was filtered off and washed with distilled water (10 cc.). After drying under reduced pressure (0.3 mm.Hg.) at 20°C., a solid (900 mg.) was obtained, which was dissolved in methanol (9 cc.). The solution was chromatographed on a column of Sephadex LH 20 (150 g.) (column diameter 20 mm., height 1.80 m.). The column was eluted with methanol, collecting 5 cc. fractions; fractions 58 to 70 were combined and concentrated to dryness under reduced pressure (20 mm.Hg) at 50°C. After drying under reduced pressure (0.3 mm.Hg), N-α-(N-α-7-methyloctanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (700 mg.) was obtained.

Rf = 0.55 [silica gel; n-butanol:pyridine:acetic acid:water (50:20:6:24 by volume)].

This product was dissolved in methanol (35 cc.) and N hydrochloric acid (1.85 cc.). Palladium on charcoal (containing 3.15 percent of palladium; 700 mg.) was added and a slow stream of hydrogen was passed through the mixture for 16 hours. After filtering and concentrating the filtrate to dryness under reduced pressure (20 mm.Hg) at 50°C., the residue was taken up in an 0.8N solution of hydrogen chloride in methanol (3 cc.). Dioxan (87 cc.) was added. The white precipitate obtained was filtered off and washed with dioxan (10 cc.) and anhydrous diethyl ether (10 cc.). After drying under reduced pressure (0.3 mm.Hg) at 20°C., the white solid (500 mg.) obtained was dissolved in methanol (2 cc.). The solution was chromatographed on a column of Sephadex LH 20 (150 g.) (column diameter 20 mm, height 1.80 m.). The column was eluted with methanol, collecting 4.5 cc. fractions; fractions 66 to 78 were combined and concentrated to dryness under reduced pressure (20 mm.Hg) at 50°C. The residue was taken up in distilled water (30 cc.) and the solution obtained lyophilised to give N-α-(N-α-7-methyloctanoyl-L-α,γ-diaminobutyryl-L-threonyl-N-α-

L-α,γ-diaminobutyryl)-colistamine pentahydrochloride (417 mg.).

Rf = 0.37[silica gel; n-butanol:pyridine:acetic acid:-water (50:20:6:24 by volume)].

| Analysis: | Calculated % | N 16.58 | Cl 13.11 |
|---|---|---|---|
| | Found | 15.67 | 12.27 |

After total hydrolysis, analysis on a Technicon auto-analyser showed the presence of the following amino acids:

Dab = 5.5   (theory = 6)
Leu = 2.0   (theory = 2)
Thr = 1.5   (theory = 2)

EXAMPLE 20

Following the procedure of Example 19 but using N-α-n-octanoyl-N-γ-benzyloxycarbonyl-L-α,γ-diaminobutyryl-L-threonyl-N-γ-benzyloxycarbonyl-L-α,γ-diaminobutyryl-hydrazide (618 mg.) (obtained as in Example 4) and tri-N-γ-(3-pyridyl-N-oxide-methoxycarbonyl)-colistamine (1 g.), N-α-(N-α-n-octanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.045 g.) was obtained.

Rf = 0.63 [silica gel; n-butanol:pyridine:acetic acid:-water (50:20:6:24 by volume)].

After removing the protective groups of the amino radicals by the procedure described in Example 19, N-α-(N-α-n-octanoyl-L-α,γ-diaminobutyryl-L-threonyl-N-α-L-α,γ-diaminobutyryl)-colistamine pentahydrochloride (655 mg.) was obtained.

Rf = 0.31 [silica gel; n-butanol:pyridine:acetic acid:-water (50:20:6:24 by volume)].

| Analysis: | Calculated % | N 16.75 | Cl 13.25 |
|---|---|---|---|
| | Found | 16.14 | 13.0 |

After complete hydrolysis, analysis on a Technicon auto-analyser showed the presence of the following amino acids:

Dab = 6.0   (theory = 6)
Leu = 2.2   (theory = 2)
Thr = 2.0   (theory = 2)

EXAMPLE 21

Following the procedure of Example 19 but using N-α-3,5,5-trimethylhexanoyl-N-γ-benzyloxycarbonyl-L-α,γ-diaminobutyryl-L-threonyl-N-γ-benzyloxycarbonyl-L-α,γ-diaminobutyrylhydrazide (760 mg.) (prepared as in Example 2) and tri-N-γ-(3-pyridyl-N-oxide-methoxycarbonyl)-colistamine (1.2 g.), N-α-(N-α-3,5,5-trimethylhexanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (0.8 g.) was obtained.

Rf = 0.66[silica gel; n-butanol:pyridine:acetic acid:-water (50:20:6:24 by volume)].

After removing the protective radicals by the procedure described in Example 19, N-α-(N-α-3,5,5-trimethyl-hexanoyl-L-α,γ-diaminobutyryl-L-threonyl-N-α-L-α,γ-diaminobutyryl)-colistamine (500 mg.) was obtained.

Rf = 0.34[silica gel; n-butanol:pyridine:acetic acid:-water (50:20:6:24 by volume)].

| Analysis | Calculated % | N 16.57 | Cl 13.11 |
|---|---|---|---|
| | Found | 15.80 | 13.35 |

After complete hydrolysis, analysis on a Technicon auto-analyser showed the presence of the following amino acids:

Dab = 5.5   (theory = 6)
Leu = 2.0   (theory = 2)
Thr = 1.96  (theory = 2)

EXAMPLE 22

Following the procedure of Example 19 but using N-α-nonanoyl-N-γ-benzyloxycarbonyl-L-α,γ-diaminobutyryl-L-threonyl-N-γ-benzyloxycarbonyl-L-α,γ-diaminobutyrylhydrazide (378 mg.) (prepared as in Example 16) and tri-N-γ-(3-pyridyl-N-oxide-methoxycarbonyl)-colistamine (600 mg.), N-α-(N-α-nonanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (572 mg.) was obtained (without purification by passing over Sephadex LH 20).

Rf = 0.60 [silica gel; n-butanol:pyridine:acetic acid:-water (50:20:6:24 by volume)].

After removal of the protective groups of the γ-amino radicals by the procedure described in Example 19, N-α-(N-α-nonanoyl-L-α,γ-diaminobutyryl-L-threonyl-N-α-L-α,γ-diaminobutyryl)-colistamine pentahydrochloride (309 mg.) was obtained.

Rf = 0.30 [silica gel; n-butanol:pyridine:acetic acid:-water (50:20:6:24 by volume)].

| Analysis: | Calculated % | N 16.58 | Cl 13.11 |
|---|---|---|---|
| | Found | 16.37 | 12.69 |

After complete hydrolysis, analysis on a Technicon auto-analyser showed the presence of the following amino acids:

Dab = 6.0   (theory = 6)
Leu = 2.1   (theory = 2)
Thr = 1.8   (theory = 2)

EXAMPLE 23

Following the procedure of Example 19 but using N-α-heptanoyl-N-γ-benzyloxycarbonyl-L-α,γ-diaminobutyryl-L-threonyl-N-γ-benzyloxycarbonyl-L-α,γ-diaminobutyrylhydrazide (730 mg.) (prepared as in Example 5) and tri-N-γ-(3-pyridyl-N-oxidemethoxycarbonyl)-colistamine (1.2 g.), N-α-(N-α-heptanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.37 g.) was obtained.

Rf = 0.61 [silica gel; n-butanol:pyridine:acetic acid:-water (50:20:6:24 by volume)].

After removal of the protective radicals by the procedure described in Example 19, N-α-(N-α-heptanoyl-L-α,γ-diaminobutyryl-L-threonyl-N-α-L-α,γ-diaminobutyryl)-colistamine pentahydrochloride (790 mg.) was obtained.

Rf = 0.26 [silica gel; n-butanol:pyridine:acetic acid:-water (50:20:6:24 by volume)].

| Analysis: | Calculated % | N 16.93 | Cl 13.39 |
|---|---|---|---|
| | Found | 16.61 | 13.90 |

After complete hydrolysis, analysis on a Technicon auto-analyser showed the presence of the following amino acids:

Dab = 5.85   (theory = 6)
Leu = 2.24   (theory = 2)
Thr = 2.00   (theory = 2)

EXAMPLE 24

Following the procedure of Example 19 but using N-α-2-norbornylacetyl-N-γ-benzyloxycarbonyl-L-α,γ-diaminobutyryl-L-threonyl-N-γ-benzyloxycarbonyl-L-α,γ-diaminobutyrylhydrazide (750 mg.) (prepared as in Example 6) and tri-N-γ-(3-pyridyl-N-oxide-methoxycarbonyl)-colistamine (1.2 g.), N-α-(N-α-2-norbornylacetyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.02 g.) was obtained.

Rf = 0.64 [silica gel; n-butanol:pyridine:acetic acid:-water (50:20:6:24 by volume)].

After removal of the protective radicals by the procedure described in Example 19 N-α-(N-α-2-norbornylacetyl-L-α,γ-diaminobutyryl-L-threonyl-N-α-L-α,γ-diaminobutyryl)-colistamine pentahydrochloride (660 mg.) was obtained.

Rf = 0.30 [silica gel; n-butanol:pyridine:acetic acid:-water (50:20:6:24 by volume)].

| Analysis: | Calculated % | N 16.63 | Cl 13.15 |
|---|---|---|---|
| | Found | 16.87 | 13.36 |

After complete hydrolysis, analysis on a Technicon auto-analyser showed the presence of the following amino acids:

Dab = 6.00   (theory = 6)
Leu = 1.74   (theory = 2)
Thr = 1.74   (theory = 2)

EXAMPLE 25

Following the procedure of Example 19 but using N-α-3-cyclohexylpropionyl-N-γ-benzyloxycarbonyl-L-α,γ-diaminobutyryl-L-threonyl-N-γ-benzyloxycarbonyl-L-α,γ-diaminobutyrylhydrazide (3.78 g.) (prepared as in Example 7) and tri-N-γ-(3-pyridyl-N-oxide-methoxycarbonyl)-colistamine (6.02 g.), N-α-(N-α-3-cyclohexylpropionyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (7.1 g.) was obtained.

Rf = 0.61 [silica gel; n-butanol:pyridine:acetic acid:-water (50:20:6:24 by volume)].

After removal of the protective radicals by the procedure described in Example 19, N-α-(N-α-3-cyclohexylpropionyl-L-α,γ-diaminobutyryl-L-threonyl-N-α-L-α,γ-diaminobutyryl)-colistamine pentahydrochloride (4.31 g.) was obtained.

Rf = 0.27 [silica gel; n-butanol:pyridine:acetic acid:-water (50:20:6:24 by volume)].

| Analysis: | Calculated % | N 16.60 | Cl 13.13 |
|---|---|---|---|
| | Found | 16.00 | 13.70 |

After complete hydrolysis, analysis on Technicon auto-analyser showed the presence of the following amino acids:

Dab = 6.00   (theory = 6)
Leu = 1.87   (theory = 2)
Thr = 1.87   (theory = 2)

EXAMPLE 26

Following the procedure of Example 19 but using N-α-2-hydroxyoctanoyl-N-γ-benzyloxycarbonyl-L-α,γ-diaminobutyryl-L-threonyl-N-γ-benzyloxycarbonyl-L-α,γ-diaminobutyryl- hydrazide (760 mg.) (prepared as in Example 8) and tri-N-γ-(3-pyridyl-N-oxide-methoxycarbonyl)-colistamine (1.2 g.), N-α-(N-α-2-hydroxyoctanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.24 g.) was obtained.

Rf = 0.65 [silica gel; n-butanol:pyridine:acetic acid:-water (50:20:6:24 by volume)].

After removal of the protective radicals by the procedure described in Example 19, N-α-(N-α-2-hydroxyoctanoyl-L-α,γ-diaminobutyryl-L-threonyl-N-αL-α,γ-diaminobutyryl)-colistamine pentahydrochloride (780 mg.) was obtained.

Rf = 0.25 [silica gel; n-butanol:pyridine:acetic acid:-water (50:20:6:24 by volume)].

| Analysis: | Calculated % | N 16.55 | Cl 13.09 |
|---|---|---|---|
| | Found | 16.16 | 13.21 |

After complete hydrolysis, analysis on a Technicon auto-analyser showed the presence of the following amino acids:

Dab = 6.00  (theory = 6)
Leu = 1.82  (theory = 2)
Thr = 1.90  (theory = 2)

EXAMPLE 27

Following the procedure of Example 19 but using N-α-2-oxononanoyl-N-γ-benzyloxycarbonyl-L-α,γ-diaminobutyryl-L-threonyl-N-γ-benzyloxycarbonyl-L-α,γ-diaminobutyrylhydrazide (770 mg.) (prepared as in Example 9) and tri-N-γ-(3-pyridyl-N-oxide-methoxycarbonyl)-colistamine (1.2 g.), N-α-(N-α-2-oxononanoyl-N-γ-benzyloxycarbonyl-L-α,γ-diaminobutyryl-L- threonyl-N-γ-benzyloxycarbonyl-L-α,γ-diaminobutyryl)-tri-N-γ-(3-pyridyl-N-oxide-methoxycarbonyl)-colistamine (1.40 g.) was obtained.

Rf. = 0.55 [silica gel; n-butanol:pyridine:acetic acid:water (50:20:6:24 by volume)].

After removal of the protective radicals by the procedure described in Example 19, N-α-(N-α-2-hydroxynonanoyl-L-α,γ-diaminobutyryl-L-threonyl-N-α-L-α,γ-diaminobutyryl)-colistamine pentahydrochloride (900 mg.) was obtained.

Rf = 0.28 [silica gel; n-butanol:pyridine:acetic acid:water (50:20:6:24 by volume)].

| Analysis: | Calculated % | N 16.38 | Cl 12.96 |
|---|---|---|---|
| | Found | 16.27 | 12.99 |

After complete hydrolysis, analysis on a Technicon auto-analyser showed the presence of the following amino acids:

Dab = 6.00  (theory = 6)
Leu = 1.85  (theory = 2)
Thr = 1.85  (theory = 2)

EXAMPLE 28

Following the procedure of Example 19 but using N-α-11-cyanoundecanoyl-N-γ-benzyloxycarbonyl-L-α,γ-diaminobutyryl-L-threonyl-N-γ-benzyloxycarbonyl-L-α,γ-diaminobutyryl-hydrazide (810 mg.) (prepared as in Example 10) and tri-N-γ-(3-pyridyl-N-oxide-methoxycarbonyl)-colistamine (1.2 g.), N-α-(N-α-11-cyanoundecanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (650 mg.) was obtained.

Rf = 0.61 [silica gel; n-butanol:pyridine:acetic acid:water (50:20:6:24 by volume)].

After removal of the protective radicals by the procedure described in Example 19, N-α-(N -α-11-cyanoundecanoyl-L-α,γ-diaminobutyryl-L-threonyl-N-α-L-α,γ-diaminobutyryl)-colistamine pentahydrochloride (380 mg.) was obtained.

Rf = 0.27 [silica gel; n-butanol:pyridine:acetic acid:water (50:20:6:24 by volume)].

| Analysis: | Calculated % | N 16.95 | 12.62 |
|---|---|---|---|
| | Found -Continued | 16.91 | 12.51 |

After complete hydrolysis, analysis on a Technicon auto-analyser showed the presence of the following amino acids:

Dab = 6.00  (theory = 6)
Leu = 1.97  (theory = 2)
Thr = 2.12  (theory = 2)

EXAMPLE 29

Following the procedure of Example 19 but using N-α-4-methoxycinnamoyl-N-γ-benzyloxycarbonyl-L-α,γ-diaminobutyryl-L-threonyl-N-γ-benzyloxycarbonyl-L-α,γ-diaminobutyrylhydrazide (910 mg.) (prepared as in Example 12) and tri-N-γ-(3-pyridyl-N-oxide-methoxycarbonyl)-colistamine (1.51 g.), N-α-(N-α-4-methoxycinnamoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.93 g.) was obtained.

Rf = 0.63 [silica gel; n-butanol:pyridine:acetic acid:water (50:20:6:24 by volume)].

After removal of the protective radicals by the procedure described in Example 19, N-α-(N-α-4-methoxyphenylpropionyl-L-α,γ-diaminobutyryl-L-threonyl-N-α-L-α,γ-diaminobutyryl)-colistamine pentahydrochloride (1.0 g.) was obtained.

Rf = 0.22 [silica gel; n-butanol:pyridine:acetic acid:water (50:20:6:24 by volume)].

| Analysis: | Calculated % | N 16.31 | Cl 12.91 |
|---|---|---|---|
| | Found | 15.65 | 13.2 |

After complete hydrolysis, analysis on a Technicon auto-analyser showed the presence of the following amino acids:

Dab = 6.00  (theory = 6)
Leu = 2.00  (theory = 2)
Thr = 2.00  (theory = 2)

EXAMPLE 30

Following the procedure for Example 19 but using N-α-4-phenylbutyryl-N-γ-benzyloxycarbonyl-L-α,γ-diaminobutyryl-L-threonyl-N-γ-benzyloxycarbonyl-L-α,γ-diaminobutyrylhydrazide (835 mg.) (prepared as in Example 14) and tri-N-γ-(33-pyridyl-N-oxide-methoxycarbonyl)-colistamine (1.2 g.), N-α-(N-α-4-phenylbutyryl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.65 g.) was obtained.

Rf = 0.67 [silica gel; n-butanol:pyridine:acetic acid:water (50:20:6:24 by volume)].

After removal of the protective radicals by the procedure described in Example 19, N-α-(N-α-4-phenylbutyryl-L-α,γ-diaminobutyryl-L-threonyl-N-αL-α,γ-diaminobutyryl)-colistamine pentahydrochloride (990 mg.) was obtained.

Rf = 0.27 [silica gel; n-butanol:pyridine:acetic acid:-water (50:20:6:24 by volume)].

| Analysis | Calculated % | N 16.51 | Cl 13.06 |
|---|---|---|---|
|  | Found | 16.18 | 12.33 |

After complete hydrolysis, analysis on a Technicon auto-analyser showed the presence of the following amino acids:

Dab = 6.00  (theory = 6)
Leu = 1.79  (theory = 2)
Thr = 1.82  (theory = 2)

EXAMPLE 31

Following the procedure of Example 19 but using N-α-3-hydroxynonanoyl-N-γ-benzyloxycarbonyl-L-α,γ-diaminobutyryl-L-threonyl-N-γ-benzyloxycarbonyl-L-α,γ-diaminobutyrylhydrazide (845 mg.) (prepared as in Example 11) and tri-N-γ-(3-pyridyl-N-oxide-methoxycarbonyl)-colistamine (1.2 g.), N-α-(N-α-3-hydroxynonanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.21 g.) was obtained.

Rf = 0.67 [silica gel; n-butanol:pyridine:acetic acid:-water (50:20:6:24 by volume)].

After removal of the protective radicals by the procedure described in Example 19, N-α-(N-α-3-hydroxynonanoyl-L-α,γ-diaminobutyryl-L-threonyl-N-α-L-α,γ-diaminobutyryl)-colistamine pentahydrochloride (460 mg.) was obtained.

Rf = 0.30 [silica gel; n-butanol:pyridine:acetic acid:-water (50:20:6:24 by volume)].

| Analysis | Calculated % | N 16.38 | Cl 12.96 |
|---|---|---|---|
|  | Found | 15.61 | 13.92 |

After complete hydrolysis, analysis on a Technicon auto-analyser showed the presence of the following amino acids:

Dab = 6.00  (theory = 6)
Leu = 1.97  (theory = 2)
Thr = 1.97  (theory = 2)

EXAMPLE 32

Following the procedure of Example 19, but using N-α-cinnamoyl-N-γ-benzyloxycarbonyl-L-α,γ-diaminobutyryl-L-threonyl-N-γ-benzyloxycarbonyl-L-α,γ-diaminobutyrylhydrazide (820 mg.) (prepared as in Example 13) and tri-N-γ-(3-pyridyl-N-oxide-methoxycarbonyl)-colistamine (1.2 g.), N-α-(N-α-cinnamoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.08 g.) was obtained.

Rf = 0.61 [silica gel; n-butanol:pyridine:acetic acid:-water (50:20:6:24 by volume)].

After removal of the protective radicals by the procedure described in Example 19, N-α-(N-α-3-phenylpropionyl-L-α,γ-diaminobutyryl-L-threonyl-N-α-L-α,γ-diaminobutyryl)-colistamine pentahydrochloride (580 mg.) was obtained.

Rf = 0.23 [silica gel; n-butanol:pyridine:acetic acid:-water (50:20:6:24 by volume)].

| Analysis: | Calculated % | N 16.68 | Cl 13.19 |
|---|---|---|---|
|  | Found | 16.27 | 13.72 |

After complete hydrolysis, analysis on a Technicon auto-analyser showed the presence of the following amino acids:

Dab = 5.72  (theory = 6)
Leu = 2.00  (theory = 2)
Thr = 1.93  (theory = 2)

EXAMPLE 33

Following the procedure of Example 19 but using N-α-octylsulphonyl-N-γ-benzyloxycarbonyl-L-α,γ-diaminobutyryl-L-threonyl-N-γ-benzyloxycarbonyl-L-α,γ-diaminobutyrylhydrazide (870 mg.) (prepared as in Example 15) and tri-N-γ-(3-pyridyl- N-oxide-methoxycarbonyl)-colistamine (1.2 g.), N-α-(N-α-octylsulphonyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (1.33 g.) was obtained.

Rf = 0.67 [silica gel; n-butanol:pyridine:acetic acid:-water (50:20:6:24 by volume)].

After removal of the protective radicals by the procedure described in Example 19, N-α-(N-α-octylsulphonyl-L-α,γ-diaminobutyryl-L-threonyl-N-α-L-α,γ-diaminobutyryl)-colistamine pentahydrochloride (820 mg.) was obtained.

Rf = 0.33 [silica gel; n-butanol:pyridine:acetic acid:-water (50:20:6:24 by volume)].

| Analysis: | Calculated % | N 16.15 | S 2.31 | Cl 12.77 |
|---|---|---|---|---|
|  | Found | 15.85 | 2.54 | 13.00 |

EXAMPLE 34

Following the procedure of Example 19 but using N-α-L- 6-methyloctanoyl-N-γ-benzyloxycarbonyl-L-α,γ-diaminobutyryl-L-threonyl-N-γ-benzyloxycarbonyl-L-α,γ-diaminobutyrylhydrazide (742 mg.) [prepared according to the method of K. Vogler et al., Helv. Chim. Acta, 48, 1161 (1965)] and tri-N-γ-(3-pyridyl-N-oxide-methoxycarbonyl)-colistamine (1.18 g.), N-α-(N-α-L-6-methyloctanoyl-N-γ-benzyloxycarbonyl-L-α,γ-diaminobutyryl-L-threonyl-N-γ-benzyloxycarbonyl-L-α,γ-diaminobutyryl)-tri-N-γ-(3-pyridyl-N-oxide-methoxycarbonyl)-colistamine (925 mg.) was obtained.

Rf = 0.66 [silica gel; n-butanol:pyridine:acetic acid:-water (50:20:6:24 by volume)].

After removal of the protective radicals by the procedure described in Example 19, N-α-(N-α-L-6- methyloctanoyl- L-α,γ-diaminobutyryl-L-threonyl-N-α-L-α,γ-diaminobutyryl)-colistamine pentahydrochloride or colistin A pentahydrochloride (585 mg.) was obtained.

Rf = 0.42 [silica gel; n-butanol:pyridine:acetic acid:water (50:20:6:24 by volume)].

| Analysis: | Calculated % | N 16.58 | Cl 13.11 |
|---|---|---|---|
| | Found | 17.25 | 13.08 |

After complete hydrolysis, analysis on a Technicon auto-analyser showed the presence of the following amino acids:

| Dab = 6.00 | (theory = 6) |
|---|---|
| Leu = 2.00 | (theory = 2) |
| Thr = 2.00 | (theory = 2) |

The colistin thus obtained is identical to colistin A obtained by fermentation.

The present invention includes within its scope pharmaceutical compositions comprising, as active ingredient, at least one new polymyxin derivative of general formula (I), or a polymyxin or circulin of general formula (II) when prepared by the process of the invention hereinbefore described, or a pharmaceutically-acceptable salt thereof, in association with a pharmaceutical carrier or coating. In human therapy, the proportion of active ingredient in the compositions may be varied according to the desired therapeutic effect. In general, the physician will decide the posology considered appropriate, taking into account the age and weight and other factors intrinsic to the patient being treated. When administered intramuscularly, the dose employed is generally between 1 and 5 mg./kg. body weight per day for an adult.

The following Example illustrates pharmaceutical compositions according to the invention.

EXAMPLE 35 a solution having the following composition was prepared.

N-α-(N-α-nonanoyl-L-α,γ-diaminobutyryl-
L-threonyl-N-α-L-α,γ-diaminobutyryl)-
colistamine pentahydrochloride    2.31 g.
distilled water                   100 cc.

This solution was sterilised by filtration through a bacteriostatic filter and was then distributed into ampoules in a quantity of 10 cc. per ampoule. The ampoules were then lyophilised under a nitrogen atmosphere and thereaftr sealed.

For therapeutic use by intramuscular administration an injectable solution is prepared at the time of use by adding physiological saline (2 cc.) to the contents of the ampoule.

A solution (2cc.) containing the active product (200 mg.) is thus obtained.

We claim:

1. Process for the preparation of polymyxins of the formula:

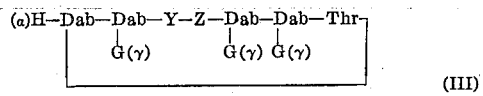

(I)

wherein A represents alkyl of three through 18 carbon atoms; alkyl of three through 18 carbon atoms substituted by hydroxy, amino or cyano; alkyl of one through four carbon atoms substituted by a member of the class consisting of monocyclic and polycyclic cycloalkyl radicals, phenyl, and phenyl substituted by halogen or alkoxy of one through four carbon atoms; or phenyl or phenyl substituted by halogen or alkoxy of one through four carbon atoms, X represents the carbonyl or sulphonyl radical, and Y—Z represents one of the chains D—Phe—Leu, D—Leu—Leu and D—Leu—Ileu, the amino acids having the L-configuration unless otherwise indicated, which comprises reacting a cyclopeptide of the formula:

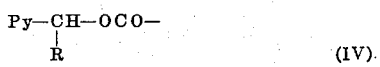

(III)

(wherein Y—Z is as hereinbefore defined, and G represents a radical which protects the γ-amino group of the α,γ-diaminobutyric acid of the general formula:

$$Py-CH-OCO- \atop R \qquad (IV)$$

in which Py represents a pyridyl or pyridyl-N-oxide radical unsubstituted or substituted by a methyl radical, and R represents hydrogen, alkyl of one through five carbon atoms, or phenyl) with a compound of the formula:

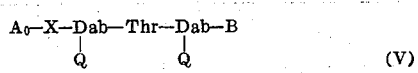

(V)

(wherein X is as hereinbefore defined, Q represents a labile radical which protects the amine function, $A_o$ represents the group A as hereinbefore defined in all cases where that group does not carry an amino radical and represents a group Q—NH—A'— when the converse is the case, with A' then representing alkylene of three through 18 carbon atoms, or $A_o$ represents a radical convertible into a group A under the conditions of removal of the protective radical Q after the reaction, and B represents hydroxy or a group which activates the carbonyl group such that the terminal group of the compound of formula (V) is the carboxy group or a derivative thereof selected from the azide, chloride, an activated ester or a mixed anhydride), followed by removing the protective groups of the amine functions.

2. Process according to claim 1 in which the terminal group of the compound of formula (V) is the acid azide group and the reaction is carried out in an organic solvent, optionally in the presence of an organic base, and at a temperature of between −15° and +25°C.

3. Process according to claim 1 in which the terminal group of the compound of formula (V) is the carboxy group and the reaction is carried out in the presence of a carbodiimide.

4. Process according to claim 1 in which Q represents a labile radical removable after the reaction of hydrogenolysis or acidolysis.

5. Process according to claim 1 in which Q is a radical G of formula (IV), the benzyloxycarbonyl or t-butoxycarbonyl group.

* * * * *